United States Patent
Piccinini et al.

(10) Patent No.: US 9,722,956 B2
(45) Date of Patent: Aug. 1, 2017

(54) MANAGING ELECTRONIC MAIL FOR AN END-USER THAT IS UNAVAILABLE

(71) Applicant: International Business Machines Corporation, Armonk, NY (US)

(72) Inventors: Sandro Piccinini, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 13/749,789

(22) Filed: Jan. 25, 2013

(65) Prior Publication Data

US 2014/0214969 A1    Jul. 31, 2014

(51) Int. Cl.
*G06F 15/17* (2006.01)
*H04L 12/58* (2006.01)

(52) U.S. Cl.
CPC .............. *H04L 51/02* (2013.01); *H04L 51/28* (2013.01); *H04L 51/22* (2013.01)

(58) Field of Classification Search
CPC ....................................................... H04L 12/58
USPC ....................................................... 709/206
See application file for complete search history.

(56) References Cited

U.S. PATENT DOCUMENTS

| | | | | |
|---|---|---|---|---|
| 5,870,548 A | * | 2/1999 | Nielsen | G06Q 10/107 379/93.24 |
| 7,295,657 B1 | | 11/2007 | Keohane et al. | |
| 7,298,831 B1 | | 11/2007 | Keohane et al. | |
| 7,499,973 B2 | | 3/2009 | Couts et al. | |
| 2005/0169213 A1 | * | 8/2005 | Scian | H04M 1/274516 370/329 |
| 2008/0049619 A1 | * | 2/2008 | Twiss | H04L 45/04 370/236 |

(Continued)

OTHER PUBLICATIONS

Disclosed Anonymously; "Method for Providing Confirmed Backup Availability Across Collaboration Tools"; IP.com Prior Art Database Technical Disclosure; IP.com No. IPCOM000205091D; Electronic Publication: Mar. 14, 2011; <http://priorartdatabase.com/IPCOM/000205091>.

(Continued)

*Primary Examiner* — Moustafa M Meky
*Assistant Examiner* — Sm Z Islam
(74) *Attorney, Agent, or Firm* — Abdul-Samad A. Adediran; Isaac J. Gooshaw (57) ABSTRACT

A first computer sends an electronic message transparently to a second computer of intended recipients of an electronic mail (e-mail), in response to the e-mail addresses of the intended recipients being entered, by a first end-user on the first computer, into a 'To' message header field of the e-mail. The second computer sends a Boolean value to the first computer, wherein one of the intended recipients is not available to respond to the e-mail. The first computer queries a repository to return to the first end-user contact information of backup contact entities to respond the e-mail for the intended recipients that are not available to respond to the e-mail. The first computer sends the e-mail to the backup contact entities that are available to respond to the e-mail. The first computer deletes the e-mail from each inbox of the backup contact entities that received but did not read the e-mail before the intended recipients read the e-mail.

21 Claims, 5 Drawing Sheets

(56) References Cited

U.S. PATENT DOCUMENTS

| | | | |
|---|---|---|---|
| 2008/0104175 A1* | 5/2008 | Keohane | G06Q 10/107 709/206 |
| 2008/0104177 A1 | 5/2008 | Keohane et al. | |
| 2008/0244011 A1* | 10/2008 | Cox | H04L 12/581 709/206 |
| 2009/0037541 A1* | 2/2009 | Wilson | G06Q 10/10 709/206 |
| 2009/0150500 A1 | 6/2009 | Kumar et al. | |
| 2010/0091959 A1 | 4/2010 | Miki et al. | |
| 2010/0146059 A1* | 6/2010 | DellaFera | G06Q 10/107 709/206 |
| 2011/0153753 A1* | 6/2011 | Childress | H04L 51/12 709/206 |

OTHER PUBLICATIONS

IBM; "Method of Delivering Emails to the Right Backup When the Recipient Is Not Available"; IP.com Prior Art Database Technical Disclosure; IP.com No. IPCOM000138468D; Original Publication: Jul. 19, 2006; Electric Publication: Jul. 19, 2006; <http://www.ip.com/pubview/IPCOM000138468D>.

IBM; "System and Method for "No-Delay" in sending the mail to backup person when primary receiver is on leave"; IP.com Prior Art Database Technical Disclosure; IP.com No. IPCOM000173392D; Original Publication: Aug. 4, 2008; Electronic Publication: Aug. 4, 2008; <http://www.ip.com/pubview/IPCOM000173392D>.

\* cited by examiner

MANAGING ELECTRONIC MAIL FOR AN
END-USER THAT IS UNAVAILABLE

BACKGROUND

1. Field of the Invention

The present invention relates generally to electronic mail (e-mail) programs, and more particularly to an e-mail program having program code for monitoring an e-mail to an intended recipient who is an end-user, and selecting, in an automated fashion, a backup contact entity to contact if the end-user is unavailable to respond to the e-mail.

2. Description of the Related Art

Oftentimes, for various reasons, an end-user of an e-mail computer system is unavailable to respond to e-mails. For example, the end-user may be on vacation or on a leave of absence. It is known for e-mail computer systems to have functionality that allows end-users to set their status to out-of-office in order to communicate, to other end-users within the e-mail computer system, when available to respond to e-mails.

Current technical solutions for managing an e-mail of an end-user unavailable to respond to an e-mail, may require a sender of the e-mail to manually identify a backup person (e.g., a manager or team member of the end-user) to contact only subsequent to the sender receiving an electronic out-of-office notification in response to the e-mail. Specifically, the sender of the e-mail can identify the backup person to contact by searching the electronic out-of-office notification for information indicating the backup person to contact, or even searching an electronic repository for storing contact information of various people and their relationships with each other. For example, the sender can search the electronic repository for the end-user's manager or team member. However, current technical solutions are limited because these may not provide program code functionality for managing the e-mail of the end-user in order to select, in an automated fashion, a backup person to contact.

SUMMARY

Aspects of an embodiment of the present invention disclose a method, computer system, and program product for selecting a backup contact entity. The computer sends an electronic message transparently to a plurality of intended recipients of an electronic mail (e-mail) having metadata, wherein the sending of the electronic message is from a first computer to a second computer in response to e-mail addresses of the plurality of intended recipients being entered, by a first end-user on the first computer, into a 'To' message header field of the e-mail. The computer sends a Boolean value from program code of the second computer to the first computer, wherein one of the plurality of intended recipients is associated with a configurable profile defining a preferred backup contact entity. The first computer determines if the one of the plurality of intended recipients is available to respond to the e-mail based on the Boolean value. The first computer queries a repository to return to the first end-user contact information of one or more backup contact entities to respond to the e-mail for the one of the plurality of intended recipients. The first computer extracts from the contact information returned, the contact information of the one or more backup contact entities available to respond to the e-mail. The first computer sends the e-mail to the one or more backup contact entities, and to the preferred backup contact entity if the one of the plurality of intended recipients is not available to respond to the e-mail. The first computer deletes the e-mail from each inbox of the backup contact entities and the preferred backup contact entity that received but did not read the e-mail before the one of the plurality of intended recipients read the e-mail.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of computer readable medium(s) may be utilized. Computer-readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide an e-mail management program having program code for monitoring an e-mail intended to be sent to an end-user, and selecting, in an automated fashion, a backup contact entity to contact if the end-user is unavailable to respond to the e-mail. For example, an entity can be a person, robot, or computer. The backup contact entity can be a backup person, a group of backup persons, or any other entity able to respond to the e-mail. The e-mail management program can be installed on one or more computers and configured to interact with other e-mail software (e.g., IBM Lotus Notes®) to extend functionality for managing e-mails for end-users that are unavailable to respond to their e-mails.

Figure 1:
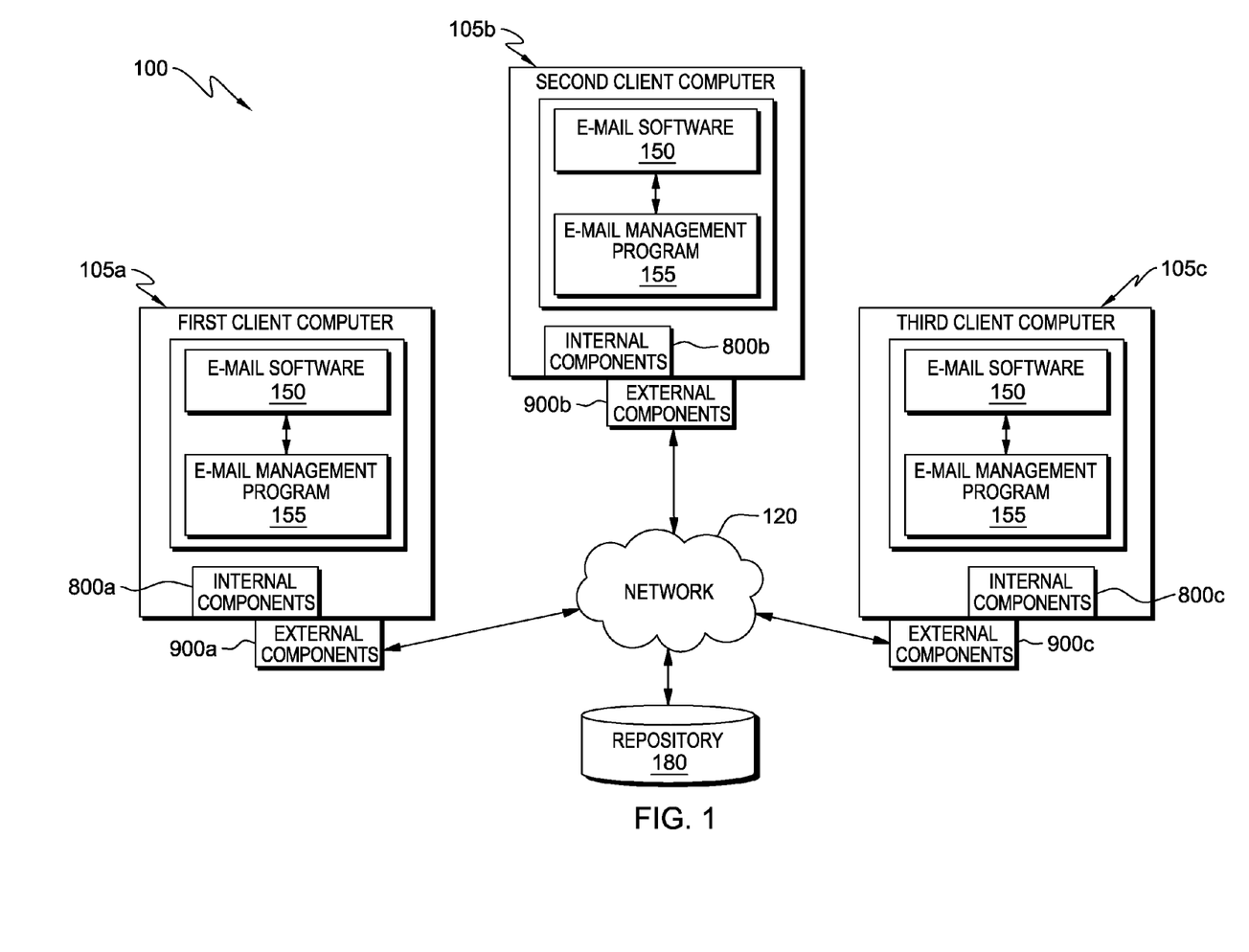
FIG. 1 is a block diagram of a computer system having client computers utilizing an e-mail management program having program code for monitoring an e-mail intended to be sent to an end-user, and selects, in an automated fashion, a backup contact entity to contact if the end-user is unavailable to respond to the e-mail according to an embodiment of the present invention.

FIG. 1 illustrates computer system 100, which includes first client computer 105a, second client computer 105b, third client computer 105c, network 120, and repository 180. Client computers 105a-105c are each installed with e-mail software 150 (e.g., IBM Lotus Notes®) and e-mail management program 155. E-mail management program 155 is program code, wherein the program code includes the following functionality: determining an intended recipient of an e-mail is unavailable to respond to the e-mail, identifying a backup contact entity to respond to the e-mail, sending the e-mail to the backup contact entity identified, and deleting the e-mail from the backup contact entity's inbox if the intended recipient reads the e-mail before the backup contact entity reads the e-mail. Thus, e-mail management program 155 can extend existing functionality of e-mail software 150. Repository 180 stores contact information of various people including relationships with each other. For example, in regard to the relationships, people can be designated as team members of other people in repository 180, as managers of other people in repository 180, or even a combination thereof. In addition, first client computer 105a, second client computer 105b, and third client computer 105c each include respective internal components 800a, 800b, and 800c, and respective external components 900a, 900b, and 900c. Internal components 800a-800c, and respective external components 900a-900c are described below in more detail with respect to FIG. 3.

In the disclosed embodiment, client computers 105a-105c are connected to each other through network 120 in a peer-to-peer computer network configuration. The peer-to-peer computer network configuration allows end-users of client computers 105a-105c to connect to each other's hard disks and directly transfer data between each other. However, in other embodiments client computers 105a-105c can be connected to a server computer via network 120 in a client-server computer network configuration, wherein each of client computers 105a-105c can request from the server computer e-mail management services that provide the functionality of e-mail management program 155 mentioned above. In the client-server computer network configuration the server computer controls access to hardware and software resources via network 120 and provides a centralized repository for data and information utilized and/or generated by e-mail management program 155.

As mentioned above, repository 180 is connected to each of client computers 105a-105c via network 120. Thus, e-mail management program 155 on client computers 105a-105c can access and query repository 180 through network 120. The query can be utilized to identify a backup contact entity to contact if an end-user, the intended recipient of an e-mail, is unavailable to respond to the e-mail. In response to the query, repository 180 can return contact information of a backup contact entity identified, wherein the contact information includes at least the following: a name of the backup contact entity, a job title of the backup contact entity, a phone number of the backup contact entity, and an e-mail address of the backup contact entity.

Figure 2A:
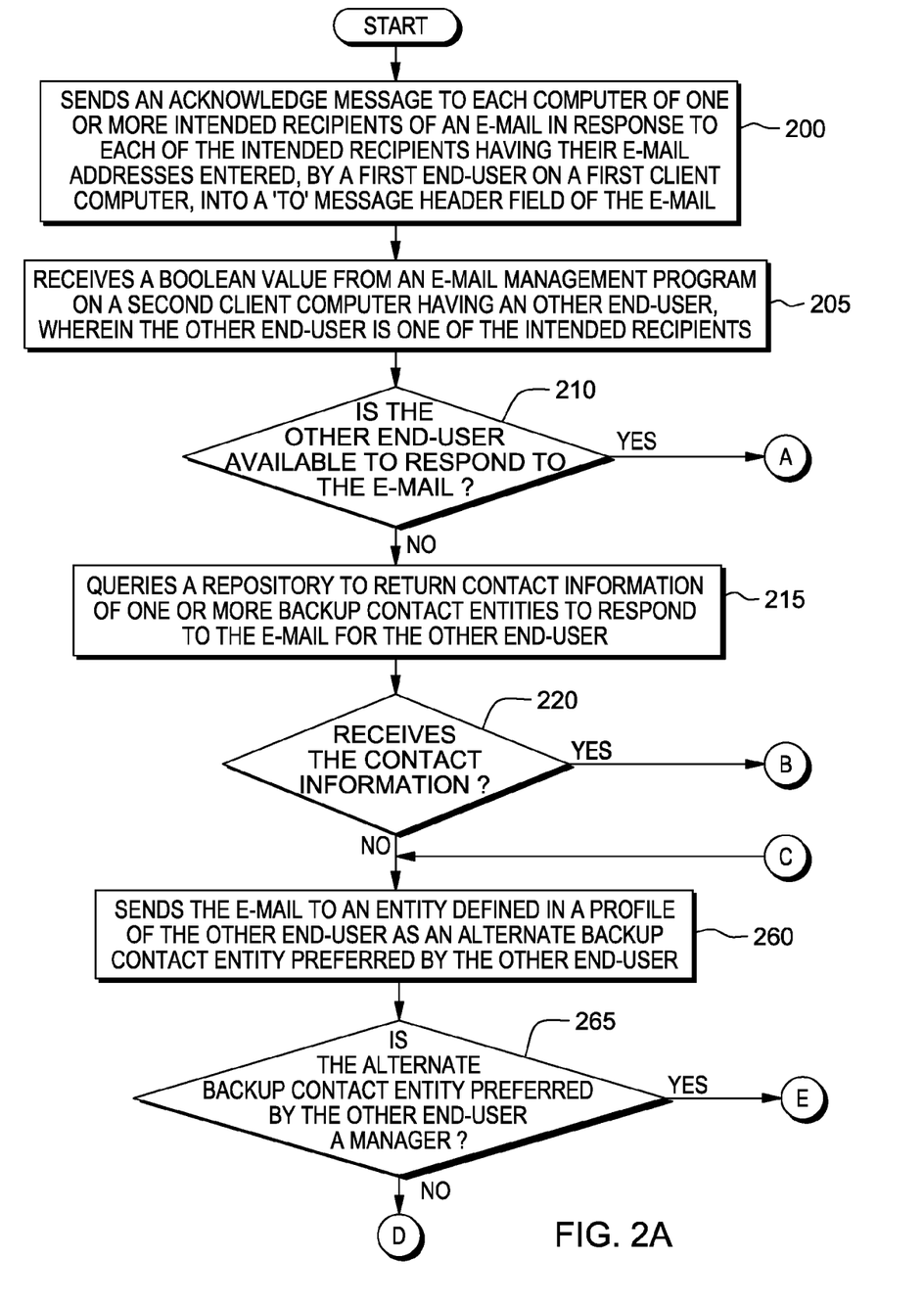
FIGS. 2A-2C are flowcharts illustrating operations of the e-mail management program according to an embodiment of the present invention.
Figure 2B:
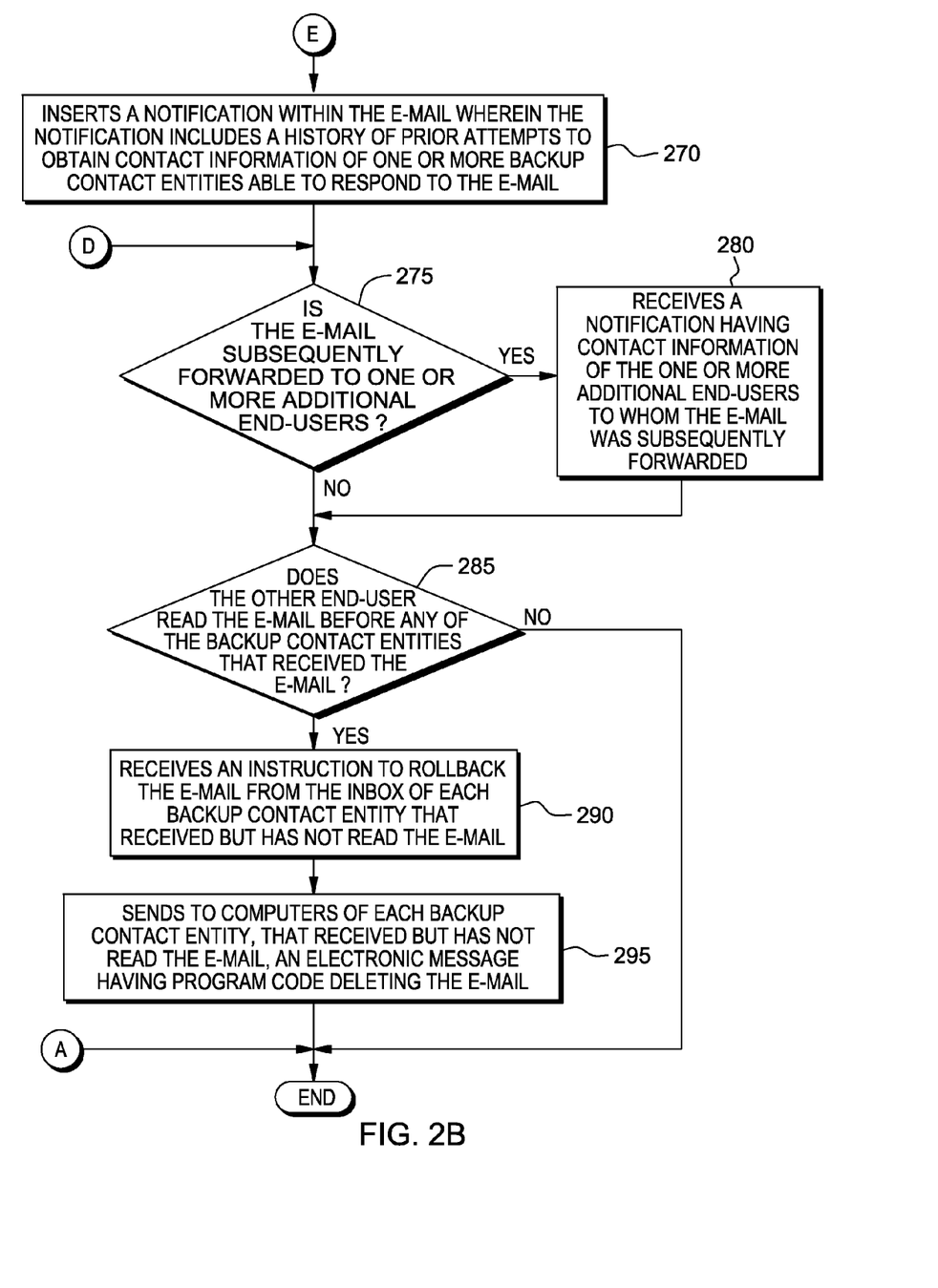
Figure 2C:
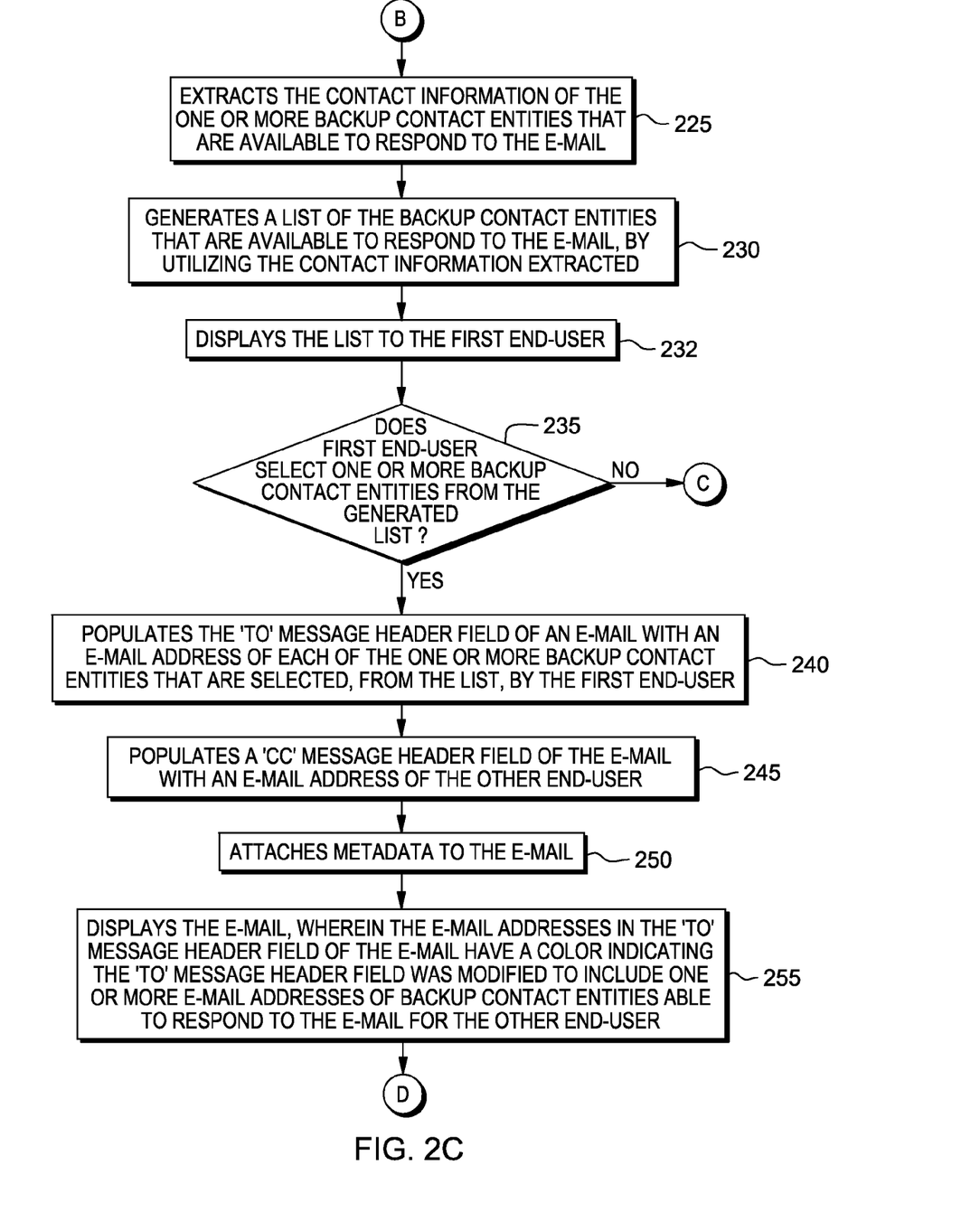

FIGS. 2A-2C are flowcharts illustrating the steps of e-mail management program 155 for monitoring an e-mail sent to an end-user wherein the end-user is an intended recipient, and selecting, in an automated fashion, a contact entity to contact if the end-user is unavailable to respond to the e-mail. Each end-user has a configurable profile that can define, among other things, whether the end-user is unavailable to respond to the e-mail. In addition, the configurable profile can define contact information of at least one or more backup contact entities preferred by the end-user to contact if the end-user is unavailable to respond to the e-mail, and if a backup contact entity available to respond to the e-mail is not identified in repository 180 by e-mail management program 155.

In the disclosed embodiment, e-mail management program 155 on first client computer 105a sends an acknowledge message to each computer of one or more intended recipients of an e-mail in response to each of the one or more intended recipients having their e-mail addresses entered, by a first end-user on first client computer 105a, into a 'To' message header field of the e-mail (block 200). The acknowledge message can be an electronic message sent transparently, and does not appear as an e-mail in the inbox of the intended recipients or the outbox of the first end-user. Moreover, in the disclosed embodiment, the acknowledge message is formatted and includes the following information: an e-mail address of the first end-user, followed by each e-mail address of the one or more intended recipients, followed by a string value that allows e-mail management program 155 to recognize the electronic message as an acknowledge message, and followed by a randomly generated unique system identifier that can be utilized to prevent e-mail management program 155 from sending duplicate acknowledge messages to each of the one or more intended recipients. However, in other embodiments, the format of the acknowledge message can be arranged differently than the order mentioned above. In response to the computers of the one or more intended recipients receiving the acknowledge message, e-mail management program 155 sends Boolean values to first client computer 105a, wherein each of the Boolean values indicate whether one of the intended recipients is available to respond to the e-mail.

Thus, e-mail management program 155 on first client computer 105a receives a Boolean value from e-mail management program 155 on second client computer 105b having an other end-user, wherein the other end-user is one of the intended recipients (block 205). Specifically, the Boolean value is sent to e-mail management program 155 on first client computer, in response to the acknowledge message previously sent.

Next, e-mail management program 155 on first client computer 105a determines, based on the Boolean value received, whether the other end-user is available to respond to the e-mail (decision block 210). If the other end-user is available to respond to the e-mail (the "YES" branch of decision block 210), then e-mail management program 155 on first client computer 105a ends. Otherwise, if the other end-user is not available to respond to the e-mail (the "NO" branch of decision block 210), then e-mail management program 155 on first client computer 105a queries repository 180 to return contact information of one or more backup contact entities to respond to the e-mail for the other end-user (block 215).

If e-mail management program 155 on first client computer 105a receives the contact information (the "YES" branch of decision block 220), then e-mail management program 155 on first client computer 105a extracts the contact information of the one or more backup contact entities that are available to respond to the e-mail (block 225 of FIG. 2C). Specifically, e-mail management program 155 on first client computer 105a extracts the contact information by sending an acknowledge message to each of the computers of the one or more backup contact entities associated with the contact information to determine which of the one or more backup contact entities are available to respond to the e-mail.

Next, e-mail management program 155 on first client computer 105a generates a list of backup contact entities that are available to respond to the e-mail, by utilizing the contact information extracted (block 230). Subsequently, e-mail management program 155 displays the list to the first end-user (block 232). If the first end-user does not select one or more backup contact entities from the generated list (the "NO" branch of decision block 235), then e-mail management program 155 on first client computer 105a sends the e-mail to an entity defined in a profile of the end-user as an alternate backup contact entity preferred by the other end-user (block 260). Otherwise, if the first end-user selects one or more backup contact entities from the list (the "YES" branch of decision block 235), then e-mail management program 155 on first client computer 105a populates the 'To' message header field of the e-mail with an e-mail address of each of the one or more backup contact entities that are selected, from the list, by the first end-user (block 240). In addition, e-mail management program 155 on first client computer 105a populates a 'Cc' message header field of the e-mail with an e-mail address of the other end-user (block 245).

Subsequently, e-mail management program 155 on first client computer 105a attaches metadata to the e-mail (block 250). The metadata can include the following information: a parameter indicating the 'To' message header field of the e-mail was modified to include the backup contact entities selected by the first end-user, a parameter value for storing contact information of entities (e.g., persons) to whom the e-mail was subsequently forwarded, parameter indicating which of the backup contact entities have or have not read the e-mail, a parameter value indicating whether the e-mail has been read by any of the intended recipients, and a list of the intended recipients included in the 'To' message header field prior to the e-mail being modified. Next, e-mail management program 155 on client computers 105a-105c displays the e-mail, wherein the e-mail addresses in the 'To' message header field of the e-mail have a color indicating the 'To' message header field was modified to include one or more e-mail addresses of backup contact entities able to respond to the e-mail for the other end-user (block 255).

Next, e-mail management program 155 determines whether the e-mail is subsequently forwarded to one or more additional end-users (decision block 275).

Otherwise, if e-mail management program 155 on first client computer 105a does not receive the contact information (the "NO" branch of decision block 220), then e-mail management program 155 on first client computer 105a sends the e-mail to an entity defined in the other end-user's profile as an alternate backup contact entity preferred by the other end-user (block 260). For example, a system programmer/administrator, can configure the other end-user's profile to have a manager defined as the alternate backup contact entity preferred by the other end-user to contact.

Next, if the alternate backup contact entity preferred by the other end-user is not a manager (the "NO" branch of decision block 265), then e-mail management program 155 determines whether the e-mail is subsequently forwarded to one or more additional end-users (decision block 275). Otherwise, if the alternate backup contact entity preferred by the other end-user is a manager (the "YES" branch of decision block 265), then e-mail management program 155 inserts a notification within the e-mail wherein the notification includes a history of prior attempts to obtain contact information of one or more backup contact entities able to respond to the e-mail (block 270). E-mail management program 155 on first client computer 105a can utilize the inserted notification to avoid attempting to requery for the contact information of the same backup contact entities. Next, if the e-mail is subsequently forwarded to one or more additional end-users (the "YES" branch of decision block 275), then e-mail management program 155 of first client computer 105a receives a notification having contact information of the one or more additional end-users to whom the e-mail was subsequently forwarded (block 280). E-mail management program 155 on first client computer 105a can utilize the notification having contact information of the one or more additional end-users to whom the e-mail was subsequently forwarded, in order to keep track of who all has received the e-mail.

Next, if the other end-user does not read the e-mail before any of the backup contact entities that received the e-mail (the "NO" branch of decision block 285), then e-mail management program 155 ends. However, if the other end-user reads the e-mail before any of the backup contact entities read the e-mail (the "YES" branch of decision block 285), then e-mail management program 155 on client computer 105b sends an instruction to e-mail management program 155 on client computer 105a to rollback (i.e., delete) the e-mail from the inbox of all the backup contact entities that received but have not read the e-mail. Thus, e-mail management program 155 on client computer 105a receives an instruction to rollback the e-mail from the inbox of each backup contact entity that received but has not read the e-mail (block 290). Accordingly, in response to receiving the instruction to rollback the e-mail, e-mail management program 155 on client computer 105a sends to computers of each backup contact entity, that received but has not read the e-mail, an electronic message having program code deleting the e-mail (block 295). E-mail management program 155 on each of client computer 105a-105c periodically monitors the e-mail in order to update the parameter values, of the metadata attached to the e-mail, to indicate which of the backup contact entities have or have not read the e-mail. Thus, e-mail management program 155 can utilize the metadata attached to the e-mail to determine each backup contact entity that received but has not read the e-mail. Next, e-mail management program 155 ends.

Figure 3:
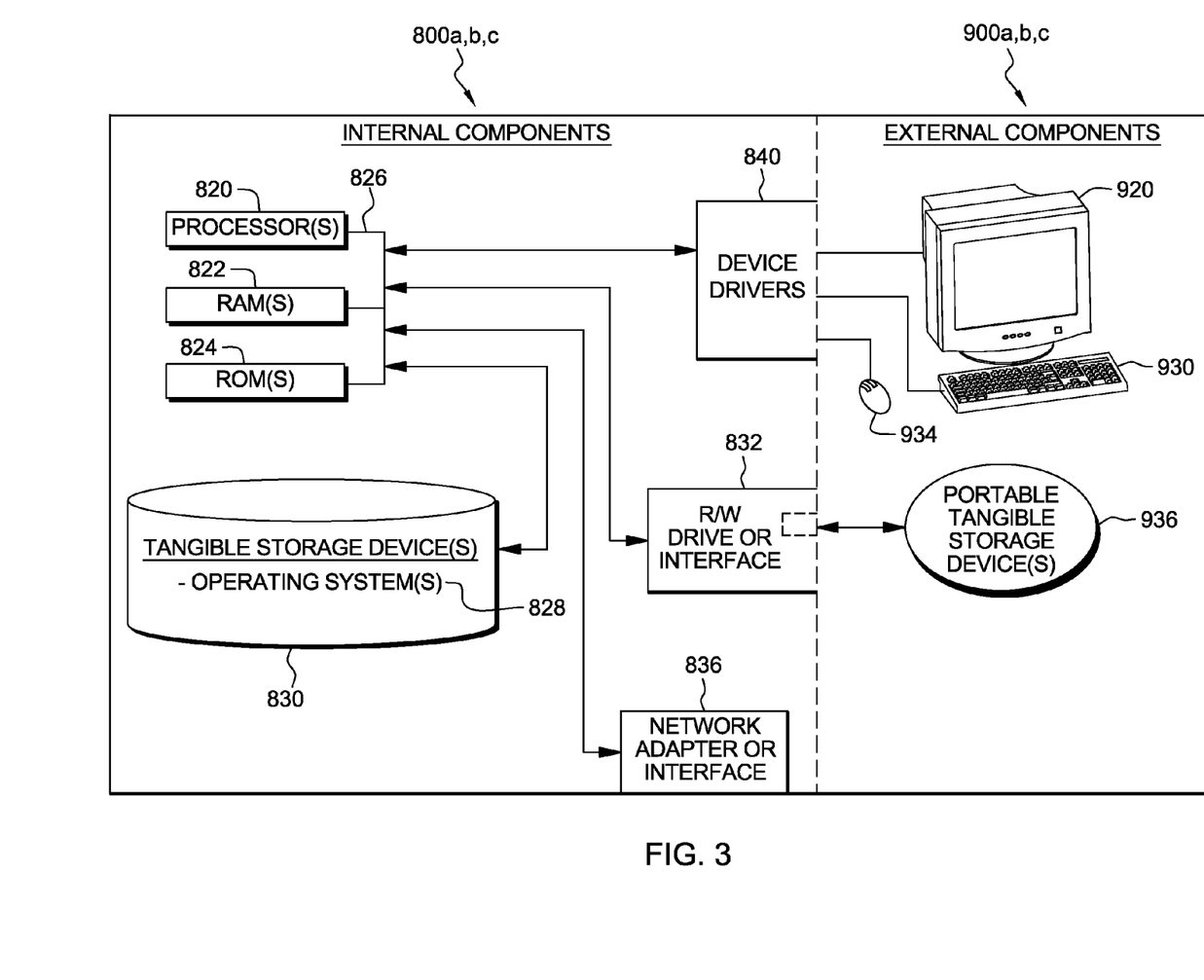
FIG. 3 is a block diagram depicting internal and external components of the client computers of FIG. 1 according to an embodiment of the present invention.

FIG. 3 is a block diagram depicting a set of internal components 800a-800c and a set of external components 900a-900c that correspond to respective client computers 105a-105c. Internal components 800a-800c each include one or more processors 820, one or more computer readable RAMs 822 and one or more computer readable ROMs 824 on one or more buses 826, and one or more operating systems 828 and one or more computer readable tangible storage devices 830. The one or more operating systems 828 and e-mail management program 155 on each client computer 105a-105c are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a-800c includes a R/W drive or interface 832 to read from and write to one or more portable computer readable tangible storage devices 936 such as CD-ROM, DVD, memory stick, magnetic tape, magnetic disk, optical disk or semiconductor storage device. E-mail management program 155 on each client computer 105a-105c can be stored on one or more of the respective portable computer readable tangible storage devices 936, read via the respective R/W drive or interface 832 and loaded into the respective hard drive or computer readable tangible storage device 830.

Furthermore, each set of internal components 800a-800c also includes a network adapter or interface 836 such as TCP/IP adapter card, wireless wi-fi interface card, or 3G or 4G wireless interface card or other wired or wireless communication link. E-mail management program 155 on each client computer 105a-105c can be downloaded to respective client computers 105a-105c from an external computer or external storage device via a network (for example, the Internet, a LAN, or a WAN) and respective network adapters or interfaces 836. From the network adapter or interface 836, e-mail management program 155 on each client computer 105a-105c is loaded into at least one respective hard drive or computer readable tangible storage device 830. The network may comprise copper wires, optical fibers, wireless transmission, routers, firewalls, switches, gateway computers and/or servers.

Each set of external components 900a-900c can include a computer display monitor 920, a keyboard 930, and a computer mouse 934. External components 900a-900c can also include touch screens, virtual keyboards, touch pads, pointing devices, and other human interface devices. Each set of internal components 800a-800c also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented.

Moreover, a variety of modifications to the depicted environments may be made based on design and implementation requirements.

In accordance with the foregoing, a method, a computer system, and a computer program product have been disclosed for monitoring an e-mail intended to be sent to an end-user, and selecting, in an automated fashion, a backup contact entity to contact if the end-user is unavailable to respond to the e-mail. However, numerous modifications and substitutions can be made without deviating from the scope of an embodiment of the invention. Therefore, one or more embodiments of the invention have been disclosed by way of example and not limitation.

What is claimed is:

1. A method for selecting a backup contact entity, the method comprising the steps of:
   prior to the sending of an electronic mail (e-mail), a first computer responding to a determination that an e-mail addresses of at least one second end user of a plurality of second end users has been added to an electronic mail (e-mail), by a first end user via the first computer, as a recipient for that electronic mail, by sending an electronic message to a second computer of the at least one second end user, wherein the e-mail addresses of the at least one second end user and the plurality of second end users are included in a 'To' message header field of the e-mail during generation of the email;
   receiving, by the first computer, a response to the electronic message, from the second computer, that includes a Boolean value from program code of the second computer, wherein the at least one second end user is associated with a configurable profile that designates a preferred backup third end user for the at least one second end user, wherein the preferred backup third end user is capable of both reading and responding to the email in place of the at least one second user;
   the first computer determining if the at least one second user is available to respond to the e-mail based on the Boolean value;
   responsive to a determination that i) the at least one second user is not available to respond to the email and that ii) the preferred backup third end user is available to respond to the email, the first computer querying a repository to return to contact information of the preferred backup third end user;
   the first computer extracting, from the contact information returned, an email address of the preferred backup third end user;
   the first computer adding, to the 'To' message header field of the e-mail, the email address of the preferred backup third end user such that the preferred backup third end user is included a recipient for the e-mail;
   the first computer visually indicating, to the first end user, that the 'To' message header field of the e-mail has been modified to include the email address of the preferred backup third end user;
   the first computer sending the e-mail to the plurality of second end users and the preferred backup third end user; and
   the first computer responding to the e-mail being read by one of the plurality of second end users by deleting the e-mail from each inbox of the plurality of second end users and the preferred backup third end user that received but did not read the e-mail.

2. The method of claim 1, wherein the metadata, in the step of sending the electronic message, comprises the following: a parameter indicating a 'To' message header field of an e-mail is modified to include the one or more backup third end users selected by the first end-user, a parameter value for storing contact information of entities to whom the e-mail was subsequently forwarded, parameter values indicating which of the one or more backup third end users have or have not read the e-mail, a parameter value indicating whether the e-mail has been read by any of the second end users, and a list of the second end users included in the 'To' message header field prior to the e-mail being modified.

3. The method of claim 1, wherein the contact information in the step of querying includes a name, a job title, a phone number, and an e-mail address of each of the one or more backup third end users.

4. The method of claim 1, wherein the step of extracting comprises:
   the first computer querying the repository to return contact information for a plurality of potential backup third end users
   the first computer sending an additional electronic message to computers of the plurality of potential backup third end users associated with the contact information; and
   based on received responses to the additional electronic message, determining which of the one or more backup third end users are available to respond to the e-mail; and
   the first computer presenting, for selection, a list of potential backup third end users that are available.

5. The method of claim 4, wherein the additional electronic message is formatted and includes the following information: an e-mail address of the first end-user, each e-mail address of the plurality of second end users, a string value that allows the additional electronic message to be recognized as an acknowledge message, and a randomly generated unique system identifier utilized to prevent a duplicate of the additional electronic message being sent to each of the plurality of second end users.

6. The method of claim 4, wherein the first computer sending the e-mail comprises:
   sending the e-mail to the preferred backup third end user if no selection is received, wherein the configurable profile indicates that the preferred backup third end user is a default selection if no selection is received; and
   inserting a notification within the e-mail if the preferred backup third end user is a manager, wherein the notification includes a history of prior attempts to obtain the contact information of one or more backup third end users to respond to the e-mail.

7. The method of claim 1, wherein the step of deleting the e-mail comprises sending, to computers of each of the one or more backup third end users that received but have not read the e-mail, an electronic message having program code deleting the e-mail.

8. A computer program product for selecting a backup contact entity, the computer program product comprising:
   a computer readable storage medium and program instructions stored on the computer readable storage medium, the program instructions comprising:
   program instructions to, prior to the sending of an electronic mail (e-mail), a first computer respond to a determination that an e-mail addresses of at least one second end user of a plurality of second end users has been added to an electronic mail (e-mail), by a first end user via the first computer, as a recipient for that electronic mail, by sending an electronic message to a second computer of the at least one second end user, wherein the e-mail addresses of the at least one second end user and the plurality of second end users are included in a 'To' message header field of the e-mail during generation of the email;

program instructions to receive, by the first computer, a response to the electronic message, from the second computer, that includes a Boolean value from program code of the second computer, wherein the at least one second end user is associated with a configurable profile that designates a preferred backup third end user for the at least one second end user, wherein the preferred backup third end user is capable of both reading and responding to the email in place of the at least one second user;

program instructions for the first computer to determine if the at least one second user is available to respond to the e-mail based on the Boolean value;

program instructions to respond to a determination that i) the at least one second user is not available to respond to the email and that ii) the preferred backup third end user is available to respond to the email, by the first computer to querying a repository to return to contact information of the preferred backup third end user;

program instructions for the first computer to extract from the contact information returned, an email address of the preferred backup third end user;

program instructions for the first computer to add, to the 'To' message header field of the e-mail, the email address of the preferred backup third end user such that the preferred backup third end user is included a recipient for the e-mail;

program instructions for the first computer to visually indicate, to the first end user, that the 'To' message header field of the e-mail has been modified to include the email address of the preferred backup third end user;

program instructions for the first computer to send the e-mail to the plurality of second end users and the preferred backup third end user; and program instructions for the first computer to respond to the e-mail being read by one of the plurality of second end users by deleting the e-mail from each inbox of the plurality of second end users and the preferred backup third end user that received but did not read the e-mail.

9. The computer program product of claim 8, wherein the metadata comprises the following: a parameter indicating a 'To' message header field of an e-mail is modified to include the one or more backup third end users selected by the first end-user, a parameter value for storing contact information of entities to whom the e-mail was subsequently forwarded, parameter values indicating which of the one or more backup third end users have or have not read the e-mail, a parameter value indicating whether the e-mail has been read by any of the second end users, and a list of the second end users included in the 'To' message header field prior to the e-mail being modified.

10. The computer program product of claim 8, wherein the contact information includes a name, a job title, a phone number, and an e-mail address of each of the one or more backup third end users.

11. The computer program product of claim 8, wherein the program instructions for the first computer to extract comprises:

program instructions for the first computer to query the repository to return contact information for a plurality of potential backup third end users program instructions for the first computer to send an additional electronic message to computers of the plurality of potential backup third end users associated with the contact information; and program instructions for the first computer to, based on received responses to the additional electronic message, determine which of the one or more backup third end users are available to respond to the e-mail; and program instructions for the first computer to present, for selection, a list of potential backup third end users that are available.

12. The computer program product of claim 11, wherein the additional electronic message is formatted and includes the following information: an e-mail address of the first end-user, each e-mail address of the plurality of second end users, a string value that allows the additional electronic message to be recognized as an acknowledge message, and a randomly generated unique system identifier utilized to prevent a duplicate of the additional electronic message being sent to each of the plurality of second end users.

13. The computer program product of claim 11, wherein the program instructions for first computer to send the e-mail comprises:

program instructions to send the e-mail to the preferred backup third end user if no selection is received, wherein the configurable profile indicates that the preferred backup third end user is a default selection if no selection is received; and program instructions to insert a notification within the e-mail if the preferred backup third end user is a manager, wherein the notification includes a history of prior attempts to obtain the contact information of one or more backup third end users to respond to the e-mail.

14. The computer program product of claim 8, wherein the program instructions for the first computer to delete the e-mail comprises sending, to computers of each of the one or more backup third end users that received but have not read the e-mail, an electronic message having program code deleting the e-mail.

15. A computer system for selecting a backup contact entity, the computer system comprising:

one or more processors, one or more computer readable memories, one or more computer readable storage media, and program instructions stored on the one or more storage media for execution by the one or more processors via the one or more memories, the program instructions comprising:

program instructions to, prior to the sending of an electronic mail (e-mail), a first computer respond to a determination that an e-mail addresses of at least one second end user of a plurality of second end users has been added to an electronic mail (e-mail), by a first end user via the first computer, as a recipient for that electronic mail, by sending an electronic message to a second computer of the at least one second end user, wherein the e-mail addresses of the at least one second end user and the plurality of second end users are included in a 'To' message header field of the e-mail during generation of the email;

program instructions to receive, by the first computer, a response to the electronic message, from the second computer, that includes a Boolean value from program code of the second computer, wherein the at least one second end user is associated with a configurable profile that designates a preferred backup third end user for the at least one second end user, wherein the preferred backup third end user is capable of both reading and responding to the email in place of the at least one second user;

program instructions for the first computer to determine if the at least one second user is available to respond to the e-mail based on the Boolean value;

program instructions to respond to a determination that i) the at least one second user is not available to respond to the email and that ii) the preferred backup third end user is available to respond to the email, by the first computer to querying a repository to return to contact information of the preferred backup third end user;

program instructions for the first computer to extract from the contact information returned, an email address of the preferred backup third end user;

program instructions for the first computer to add, to the 'To' message header field of the e-mail, the email address of the preferred backup third end user such that the preferred backup third end user is included a recipient for the e-mail;

program instructions for the first computer to visually indicate, to the first end user, that the 'To' message header field of the e-mail has been modified to include the email address of the preferred backup third end user;

program instructions for the first computer to send the e-mail to the plurality of second end users and the preferred backup third end user; and program instructions for the first computer to respond to the e-mail being read by one of the plurality of second end users by deleting the e-mail from each inbox of the plurality of second end users and the preferred backup third end user that received but did not read the e-mail.

16. The computer system of claim 15, wherein the metadata comprises the following: a parameter indicating a 'To' message header field of an e-mail is modified to include the one or more backup third end users selected by the first end-user, a parameter value for storing contact information of entities to whom the e-mail was subsequently forwarded, parameter values indicating which of the one or more backup third end users have or have not read the e-mail, a parameter value indicating whether the e-mail has been read by any of the second end users, and a list of the second end users included in the 'To' message header field prior to the e-mail being modified.

17. The computer system of claim 15, wherein the contact information includes a name, a job title, a phone number, and an e-mail address of each of the one or more backup third end users.

18. The computer system of claim 15, wherein the program instructions for the first computer to extract comprises:

program instructions for the first computer to query the repository to return contact information for a plurality of potential backup third end users program instructions for the first computer to send an additional electronic message to computers of the plurality of potential backup third end users associated with the contact information; and program instructions for the first computer to, based on received responses to the additional electronic message, determine which of the one or more backup third end users are available to respond to the e-mail; and program instructions for the first computer to present, for selection, a list of potential backup third end users that are available.

19. The computer system of claim 18, wherein the additional electronic message is formatted and includes the following information: an e-mail address of the first end-user, each e-mail address of the plurality of second end users, a string value that allows the additional electronic message to be recognized as an acknowledge message, and a randomly generated unique system identifier utilized to prevent a duplicate of the additional electronic message being sent to each of the plurality of second end users.

20. The computer system of claim 15, wherein the program instructions for first computer to send the e-mail comprises:

program instructions to send the e-mail to the preferred backup third end user if no selection is received, wherein the configurable profile indicates that the preferred backup third end user is a default selection if no selection is received; and program instructions to insert a notification within the e-mail if the preferred backup third end user is a manager, wherein the notification includes a history of prior attempts to obtain the contact information of one or more backup third end users to respond to the e-mail.

21. The computer system of claim 15, wherein the program instructions for the first computer to delete the e-mail comprises sending, to computers of each of the one or more backup third end users that received but have not read the e-mail, an electronic message having program code deleting the e-mail.

* * * * *